United States Patent
Jones et al.

(10) Patent No.: US 6,573,928 B1
(45) Date of Patent: Jun. 3, 2003

(54) DISPLAY CONTROLLER, THREE DIMENSIONAL DISPLAY, AND METHOD OF REDUCING CROSSTALK

(75) Inventors: Graham Roger Jones, Faringdon (GB); Nicolas Steven Holliman, Wallingford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/303,863

(22) Filed: May 3, 1999

(30) Foreign Application Priority Data

May 2, 1998 (GB) .............................. 9809422

(51) Int. Cl.[7] .......................... H04N 15/00; G09G 3/36
(52) U.S. Cl. ......................... 348/51; 345/89; 345/690
(58) Field of Search ............................. 348/51, 42, 60, 348/43; 345/58, 89, 92, 94, 100, 204, 690

(56) References Cited

U.S. PATENT DOCUMENTS

| | | | |
|---|---|---|---|
| 5,264,964 A | | 11/1993 | Faris |
| 5,473,338 A | * | 12/1995 | Prince et al. ................. 345/58 |
| 5,553,203 A | | 9/1996 | Faris |
| 5,798,740 A | * | 8/1998 | Bitzakidis et al. ............ 345/92 |
| 5,818,402 A | * | 10/1998 | Park et al. ..................... 345/58 |
| 6,211,851 B1 | * | 4/2001 | Lien et al. ..................... 345/89 |

FOREIGN PATENT DOCUMENTS

| | | |
|---|---|---|
| EP | 0389842 | 10/1990 |
| EP | 0546780 | 7/1992 |
| EP | 0645926 | 3/1995 |
| EP | 0696144 | 2/1996 |
| EP | 0724175 | 7/1996 |
| JP | 07056249 | 3/1995 |
| JP | 09247713 | 9/1997 |
| WO | 9426072 | 11/1994 |
| WO | 9631985 | 10/1996 |

OTHER PUBLICATIONS

XP–002134208, "Reducing Crosstalk between stereoscopic views", James S. Lipscomb, IBM Thomas J. Watson Research Ctr., 92–95, SPIE vol. 2177.
PCT International Search Report of Mar. 28, 2000 for International Application No. 9903431.3.
British Search Report dated Aug. 28, 1998 related to British Patent Application No. GB 9809422.0.

* cited by examiner

*Primary Examiner*—Gims S. Philippe
(74) *Attorney, Agent, or Firm*—Renner, Otto, Boisselle & Sklar

(57) ABSTRACT

A stereoscopic display controller supplies serial picture element data to a scanned stereoscopic display which includes a plurality of picture elements. Each of the picture elements includes image data for M color components, while M is greater than one. The stereoscopic display controller includes: N memories, N being an integer greater than one; a memory controller arranged to write the picture element data for N different views of a three-dimensional image in the respective memories, and arranged to control reading of the memories in turn so that image data for consecutively scanned picture elements of the display are read from different ones of the memories; and a data reordering circuit coupled to outputs of the memories and arranged to reorder the image data for at least one of the color components.

4 Claims, 19 Drawing Sheets

FIG 1
PRIOR ART

R = 8 bit red component
G = 8 bit green component
B = 8 bit blue component
A = 8 bit spare (sometimes used as alpha component) One bit will be used to indicate a stereo pixel.

DISPLAY CONTROLLER, THREE DIMENSIONAL DISPLAY, AND METHOD OF REDUCING CROSSTALK

TECHNICAL FIELD OF THE INVENTION

The present invention relates to a display controller and to a three dimensional (3D) display including such a controller. The present invention also relates to a method of reducing crosstalk, for instance between different views in a 3D display.

DESCRIPTION OF THE RELATED ART

Figure 1:
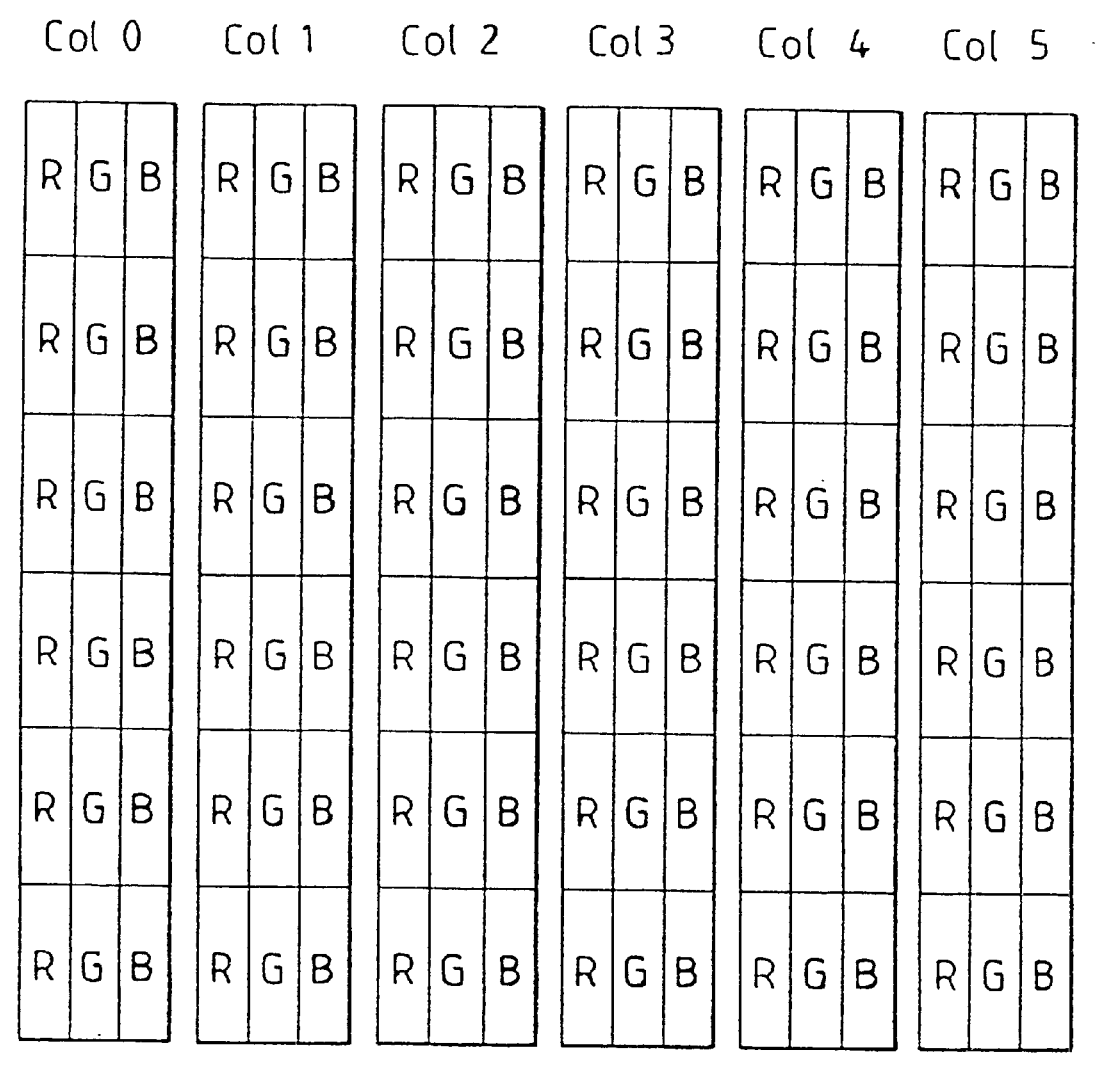

FIG. 1 of the accompanying drawings illustrates the layout of picture elements (pixels) of a standard type of liquid crystal device (LCD). The LCD is for use in a colour display and comprises red, green and blue pixels indicated by R, G and B. The pixels are arranged as columns Col 0 to Col 5 with the red, green and blue pixels being aligned vertically. Thus, the left-most column of pixels Col 0 displays the left-most strip of an image to be displayed, the adjacent column Col 1 to the right displays the next column of the image and so on.

As illustrated in FIG. 2a of the accompanying drawings, such an LCD may be used to form a 3D autostereoscopic display. The 3D display comprises an LCD 1 which acts as a spatial light modulator (SLM) for modulating light from a backlight 2. A parallax optic cooperates with the LCD 1 in order to form viewing windows. FIG. 2a illustrates a 3D autostereoscopic display of the front parallax barrier type in which the parallax optic comprises a parallax barrier 3. The parallax barrier 3 comprises a plurality of parallel vertically extending laterally evenly spaced slits such as 4, each of which is aligned with the middle of a pair of individual colour pixel columns. For instance, the slit indicated at 4 in FIG. 2a is aligned with a column 5 of blue pixels and a column 6 of green pixels.

FIG. 2b illustrates the viewing window structure for a two view autostereoscopic 3D display of the type shown in FIG. 2a. By spatially multiplexing two views forming a stereoscopic pair across the LCD 1, the left and right views are visible in viewing windows 7 such that, provided an observer is disposed such that the left eye is in a left viewing window L and the right eye is in a right viewing window R, a 3D image can be perceived. Such positions are referred to as orthoscopic positions and are illustrated at 8, 9 and 10 in FIG. 2b.

FIG. 2b also illustrates pseudoscopic viewing positions 11 to 14. When the observer is in one of these positions, the left eye views the right eye image whereas the right eye views the left eye image. Such viewing positions should be avoided.

In order to ensure that the left and right viewing windows occur in the correct locations, left and right image data are supplied to an LCD of the type shown in FIG. 1 in the way illustrated in FIG. 3. The colour image data for the left-most strip of the left image are displayed by the red, green and blue pixels columns indicated at Col 0 Left. Similarly, the colour data for the left-most strip of the right eye view are displayed by the columns of pixels indicated at Col 0 Right. This arrangement ensures that the image data for the left and right views are sent to the appropriate left and right viewing windows. This arrangement also ensures that all three pixel colours R, G and B are used to display each view strip. Thus, as compared with the layout shown out in FIG. 1, the red and blue pixels of the left-most column display image data of the left view whereas the green pixels of the left-most column display image data of the right view. In the next column, the red and blue pixels display image data of the right view whereas the green pixels display image data of the left view. Thus, when using a standard LCD 1 of the type illustrated in FIGS. 1 to 3, interlacing of left and right view image data with "swapping" of the green components between columns of RGB pixels is necessary. Of course, depending upon the display set-up, the red or blue components rather than the green components may be swapped.

A standard PC (computer) is not capable of performing such interlacing and green (or red or blue) component swapping at standard video frame rate because every pixel "write" operation has to be modified compared with displaying a two dimensional (2D) image in the standard layout illustrated in FIG. 1.

Autostereoscopic 3D displays using flat panel LCDs are disclosed in British patent application numbers 9619097.0 and 9702259.4, European patent publication numbers 724175, 696144,645926, 389842, and U.S. Pat. Nos. 5,553, 203 and 5,264,946.

FIG. 4a of the accompanying drawings illustrates part of a known type of video board for use in computers. Examples of such video boards are disclosed in ARM VIDC20 Datasheet, Advanced Risc Machines Limited, February 1995, Fuchs et al, "Pixel planes: a VLSI-oriented design for a raster graphic engine", VLSI Design, third quarter 1981, pp 20–28, and Harrel et al, "Graphic rendering architecture for a high performance desktop work station", Proceedings of ACM Siggraph conference, 1993, pp 93–100. The general layout of such an arrangement is illustrated in FIG. 4a of the accompanying drawings. Data to be displayed are supplied in serial form on a data bus 20 and addresses defining screen locations for the pixels are supplied on an address bus 21. The data bus 20 is connected to the inputs of several banks of random access memories (two shown in the drawing) such as VRAMs 22 and 23. The address bus 21 is connected to a memory management system 24 which converts the screen addresses into memory addresses which are supplied to the address inputs of the memories 22 and 23.

Output ports of the memories 22 and 23 are connected via a latch circuit 30 to a first in first out (FIFO) register 25 of a video controller 26, which additionally comprises circuit 27 for supplying red (R), green (G), blue (B), horizontal synchronisation (H) and vertical synchronisation (V) signals to a display device. The memories 22 and 23 and the register 25 are controlled so that individual pixel data are read alternately from the memories 22 and 23 and supplied in the correct order to the circuit 27. The circuit 27, for instance, serialises the data and contains a colour pallet look up table (LUT) and digital-analogue converters (DAC). Timing signals for the video board are generated by a timing generator 28.

FIG. 4b illustrates the latch circuit 30 in more detail. The latch circuit 30 comprises latches 40 and 41 connected to the output ports of the memories 22 and 23, respectively. Each of the latches 40 and 41 comprises 32 one bit latches arranged as groups of eight for latching R, G, B and A data from the respective memory. The eight bits A are described hereinafter. The latches 40 and 41 have latch enable inputs connected together and to an output of the timing generator 28 supplying latch enable signals L.

The latch circuit 30 further comprises three switching circuits 42, 43 and 44, each of which comprises eight individual switching elements whose control inputs are connected together. The control inputs of the switching circuits 42, 43 and 44 are connected together and to an output of the timing generator 28 supplying a switching signal SW. The timing generator 28 has a further output supplying write enable signals F to the register 25.

FIG. 4c is a timing diagram illustrating the signals L, SW and F. These signals are synchronised by the timing generator 28 to the rest of the video board.

When new display data are available at the output ports of the memories 22 and 23, the latch enable signal L goes high, for instance as illustrated at time t1. The latches 40 and 41 thus latch the display data. Shortly after the latch enable signal L has returned to zero, the switching signal SW rises to a high level. At time t2 the switching circuits 42, 43 and 44 are switched to the state illustrated in FIG. 4b such that the RGB outputs of the latch 40 are connected to the register 25. At time t3 a write enable signal f is supplied to the register 25 so that the RGB data from the latch 40 are written into the register 25. At time t4, the write enable signal F is disabled so as to prevent further data from being written into the register 25 until the next write enable signal.

At time t5, the switching signal SW goes to the low level so that the switching circuits 42, 43 and 44 connect the outputs of the latch 41 to the register 25. A further write enable signal F occurs between times t6 and t7 so that the data from the latch 41 are written into the register 25.

The next latch enable signal L occurs at time t8 and the process repeated. Thus, data are written into the register 25 alternately from the registers 22 and 23.

The display device is notionally or physically divided into pixels and is of the scanned type. Image data for adjacent pixels are supplied consecutively to the display device and likewise lines of image data are supplied consecutively. The data rate required by the display device therefore depends on the frame or field rate, the number of display lines per frame or field, and the number of pixels per line. Standard video rates are typically 50 interlaced fields per second but can exceed this and may, for instance, be of the order of 70 or 100 interlaced fields or non-interlaced frames per second. Each frame typically comprises 600 lines and there are typically 800 pixels per line. Each colour component is typically encoded by 8 bits. Accordingly, the input serial data rate required by display devices can exceed the maximum output rate of available memory devices.

The arrangement shown in FIG. 4a allows increased data rates to be achieved by using multiple memories. With the two memories 22 and 23 illustrated, the maximum data rate for supplying image data to the display device is substantially equal to twice the rate at which each of the memories 22 and 23 can be read. Where two memories or two banks of memories are provided and pixel data are read alternately from the memories or memory banks, the image data are stored in the memories 22 or 23 as illustrated in FIG. 5 of the accompanying drawings. In particular, image data for the even pixel columns are stored in the memory 22 whereas image data for the odd pixel columns are stored in the memory 23.

It is also known to provide multiple video memories which are read simultaneously so as to increase the capacity or effective data rate for display devices. Examples of these techniques are disclosed Pinkham et al, "Video RAM Excels at Fast Graphics", Electronic Design, Aug. 18, 1983, pp 160–172 and Whitton, "Memory designed for raster graphics displays com", IEEE Computer Graphics and Applications March, 1984, pp 48–65.

A known type of video board memory system for stereoscopic displays is disclosed in Silicon Graphic Inc., "Reality engine in visual simulation: technical overview", 1992. In this arrangement, memory is interleaved among parallel graphics processors and the processors are arranged such that they always process adjacent pixels. Stereoscopic images are supplied time sequentially to the display such that left and right eye views occupy alternate fields of each video frame.

U.S. Pat. No. 5,553,203 discloses a technique for producing spatially multiplexed images using five memory arrays. Two of the memory arrays are used for left and right eye image data. Another two of the arrays are used for copying the initial images processed by a spatial modulation function. The fifth memory array holds the spatially multiplexed image. Such an arrangement requires extra memory compared with a standard "frame-buffer" arrangement and so is substantially more expensive and has increased electrical power requirements.

JP8-146454 discloses a 3D display having a memory arrangement with allows left and right eye images to be preserved separately and rewritten at any time. A separate memory bank is used for each image.

SUMMARY OF THE INVENTION

According to a first aspect of the invention, there is provided a stereoscopic display controller for supplying serial picture element data to a scanned stereoscopic display, where each picture element comprises image data for M colour components, where M is greater than one, the display controller comprising:

N memories, where N is an integer greater than one;

a memory controller arranged to write picture element data for N different views of a three dimensional image in respective ones of the memories, and arranged to control reading of the memories in turn so that image data for consecutively scanned picture elements of the display are read from different ones of the memories; and a data reordering circuit coupled to outputs of said memories and arranged to reorder image data for at least one of said colour components.

N may be equal to two. Each picture element of image data may comprise image data for M colour components, where M is greater than one, and the display controller may comprise a data reordering circuit for simultaneously supplying image data of at least one first colour component and image data of at least one second colour component different from the first colour component for consecutively scanned picture elements of the display. M may be equal to three. The at least one first colour component may comprise red and blue colour components and the at least one second colour component may comprise a green colour component.

The display controller may be arranged such that each picture element written to a memory is a multi-bit word comprising a portion for each colour component. Alternatively, each said picture element written to a memory may be a codeword, the display controller comprising a codeword converter coupled between the data reordering circuit and said memory outputs for converting codewords into respective multi-bit words each comprising a portion for each colour component.

The data reordering circuit of the display controller may be arranged to interchange picture elements read from different memories for said at least one colour component. Alternatively, the data reordering circuit may be arranged to delay picture elements read from each of said memories for said at least one colour component by one picture element.

The memory controller may be arranged to replicate picture element data for a two dimensional image in corresponding memory locations of the memories.

Each of the memories may comprise at least one memory device.

The display controller may comprise a latch for receiving output data from the memories.

The display controller may comprise a first in first out circuit for receiving output data from the memories.

According to a second aspect of the invention, there is provided a three dimensional display comprising a display controller according to the first aspect of the invention, a scanned stereoscopic display having a plurality of columns of picture elements, and a parallax optic having a plurality of parallax elements, each of which is associated with N adjacent columns of the picture elements.

According to a third aspect of the present invention, there is provided a method of supplying serial picture element data corresponding to N different views of a three dimensional image, to a scanned stereoscopic display, the method comprising delaying picture elements associated with a first colour component by one picture element relative to picture elements of the other colour component(s).

Preferably, picture element data for said N views is written to respective ones of N different memories, and consecutively scanned picture elements are read from each of said memories. Thereafter said step of delaying picture elements associated with a first colour component for each read picture element stream is carried out.

According to a fourth aspect of the present invention, there is provided a stereoscopic display controller for supplying serial picture element data corresponding to N different views of a three dimensional image, to a scanned stereoscopic display, the controller being arranged to delay picture elements associated with a first colour component by one picture element relative to picture elements of the other colour component(s).

According to a fifth aspect of the present invention, there is provided a three dimensional display comprising a display controller according to the above fourth aspect of the present invention, a scanned stereoscopic display having a plurality columns of picture elements, and a parallax optic having a plurality of parallax elements, each of which is associated with N adjacent columns of the picture elements.

A problem which can adversely affect stereoscopic displays is crosstalk. Crosstalk is generated by stray light leaking between two "viewing channels". This results from several factors including scattering and diffraction by optical elements of display devices. The result is that the observer receives some of the left image with the right eye and vice versa. This appears as a low intensity image in the background and is often referred to as a ghost image. Crosstalk is undesirable as it is not a natural phenomenon and distracts the observer and causes visual stress. This problem is addressed in the article "Reducing Crosstalk Between Stereoscopic Displays", SPIE Vol.2177, pp. 92–95.

According to a sixth aspect of the invention, there is provided a method of reducing crosstalk between first and second images defined by respective sets of picture elements, to produce respective sets of crosstalk corrected picture elements, the method comprising:

adding a grey level to the first image to form a first sum;

adding said grey level to the second image to form a second sum;

subtracting from the first sum an amount equal to a given fraction of said second image; and subtracting from the second sum an amount equal to the given fraction of said first image, wherein these steps comprise the calculation of a partial result which is used to determine crosstalk corrected picture elements for both the first and second images.

Preferably, each picture element comprises M colour components having an intensity value, and the method further comprises, for an intensity level $I_x$ of each of the picture elements of said first image, determining a crosstalk corrected picture intensity level $I_{ox}$ according to:

$$I_{ox} = I_x + \frac{K(I_m - I_x - I_y - 1)}{(I_m + 1)}$$

or an equivalent form thereof and for an intensity level $I_y$ of each of the picture elements of said second image, determining a crosstalk corrected picture intensity level $I_{oy}$ according to:

$$I_{oy} = I_y + \frac{K(I_m - I_x - I_y - 1)}{(I_m + 1)}$$

or an equivalent form thereof,
where
K is the scalar crosstalk correction; and
$I_m$ is the scalar maximum value of each colour component.

More preferably, the division operation in the preceding equation is implemented using a bit-shift operation. By restricting K to being a factor of 2, $I_{oy}$ may be easily computed using hardware components.

Preferably, the partial result used to determine crosstalk corrected picture elements is:

$$K(I_m - I_x - I_y - 1)$$

It is possible to provide a display controller by modifying standard video display systems by using interleaved memory banks in order to permit interlacing of columns or vertical strips of left and right colour stereoscopic image pixel data. Interlacing is performed as the image data for the individual pixels are written to the memories. Data output from the memories may be processed when necessary in order to perform swapping of colour components, for instance to achieve the correct left and right image interlacing for flat panel displays.

The stereo image interlacing can be implemented in hardware with a simple addition to the widely used multibank video memory architecture. This has significant commercial advantages in requiring only small changes to existing video circuit designs in order to drive autostereoscopic displays. Further, it is not necessary to provide extra memory, for instance in image generating computers. This results in lower numbers of integrated circuits, smaller board sizes and reduced power consumption compared with known arrangements for generating and displaying 3D images.

Interlacing of stereo images can be performed with minimal extra time penalties in software. Thus, no substantial increase in processing time and memory capacity is needed.

It is possible to display 2D images, 3D images or mixtures of the two simultaneously on the display.

It is also possible to provide a technique for reducing crosstalk between images by means of an algorithm which requires little additional processing time. Thus, higher quality images can be produced with reduced visual stress to an observer and with no substantial increase in the number of integrated circuits and the power consumption.

According to a seventh aspect of the present invention there is provided a stereoscopic display controller for supplying picture element data for N different views to a scanned stereoscopic display, the controller comprising:

- a memory comprising a two-dimensional array of memory elements mapped to pixels of the stereoscopic display;
- a memory controller arranged to write picture element data for each said image into a contiguous block of memory elements and to read picture element data from the memory row by row;
- at least one buffer for receiving at least a part of each row as it is read from the memory;
- a first data reordering circuit for reordering picture element data contained in the buffer, and any data read from the memory but not contained in the buffer, to provide a stream of picture element data in which the N views are interlaced; and
- a second data reordering circuit arranged to receive said data stream and to reorder picture element data for at least one of said colour components.

Preferably, the memory controller is arranged to write picture element data for each image so that the data occupies a set of adjacent columns of memory elements.

Preferably, the memory is provided by a single memory device. Alternatively however, the memory may be provided by a plurality of memory devices.

In certain embodiments of the present invention said buffer is arranged to store the first half of a row of picture element data read from the memory. The first data reordering circuit is then arranged to interleave the buffered picture element data with the picture element data of the second half of the same row of picture elements as the second half of the row is read from the memory.

In other embodiments of the invention, said buffer comprises first and second buffers each arranged to store a full row of memory elements. The memory controller is arranged to write rows of picture element data alternately into the first and second buffers, whilst said first data reordering circuit is arranged to interleave the picture element data in one of the first and second buffers whilst data is being read into the other. More preferably, each of the first and second buffers comprises a pair of half row buffers.

The invention will be further described, by way of example with reference to the accompanying drawings, in which:

DESCRIPTION OF THE DRAWINGS

FIG. 1 is a diagram illustrating the pixel layout of a known type of LCD;

FIG. 2b is a diagrammatic plan view illustrating the formation of viewing windows by a display of the type shown in FIG. 2a;

FIG. 4b is a more detailed schematic diagram of part of the controller of FIG. 4a;

FIG. 4c is a waveform diagram illustrating waveforms which occur in the controller of FIG. 4a;

FIG. 5 illustrates the organisation of data in memories of the display controller of FIG. 4a;

FIG. 6b is a more detailed schematic diagram of part of the controller FIG. 6a;

FIG. 6c is a waveform diagram illustrating waveforms which occur in the controller of FIG. 6a;

FIGS. 7 and 8 are views similar to FIG. 5 illustrating different data organisations of the memories of the display controller of FIG. 6a;

FIG. 11 is a diagram illustrating a possible arrangement of video pixel data supplied to the display controller of FIG. 6a;

Like reference numerals refer to like parts throughout the drawings.

DETAILED DESCRIPTION OF THE INVENTION

Figure 2A:
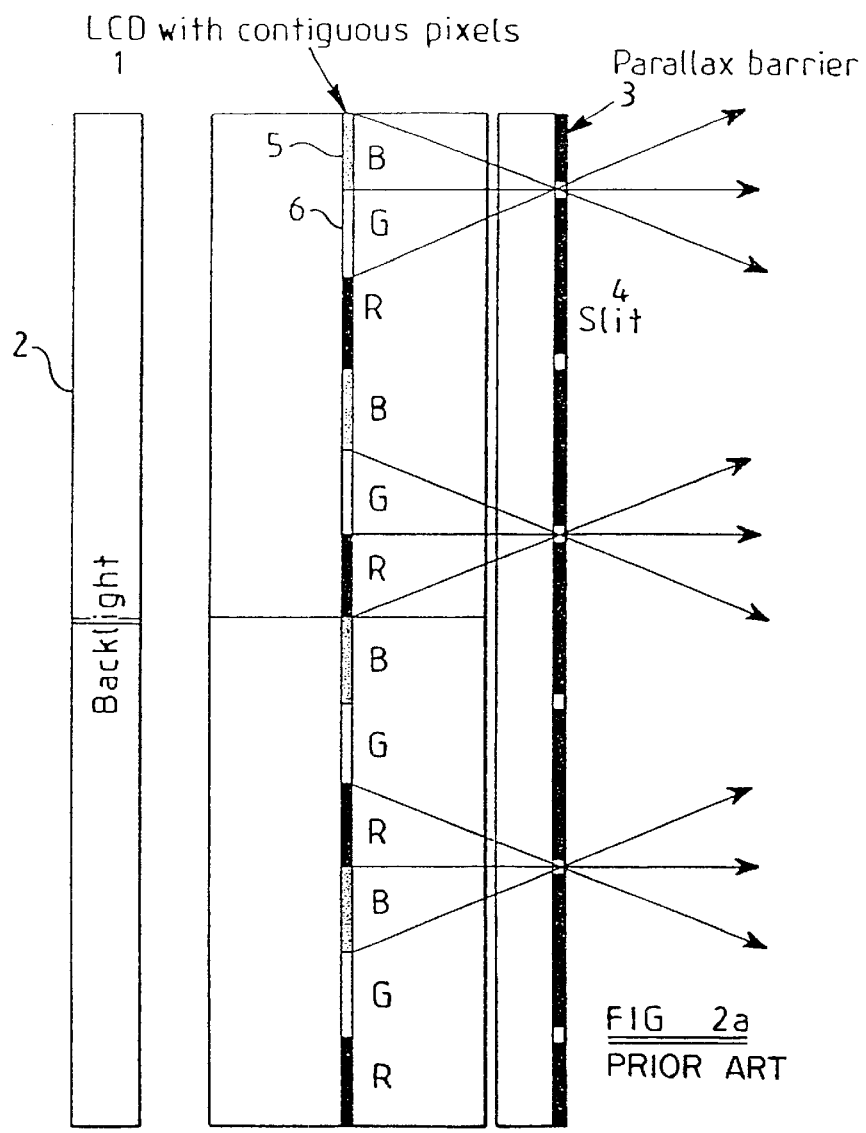
FIG. 2a is a diagrammatic lateral cross-sectional view of a known type of a 3D autostereoscopic display.
Figure 2B:
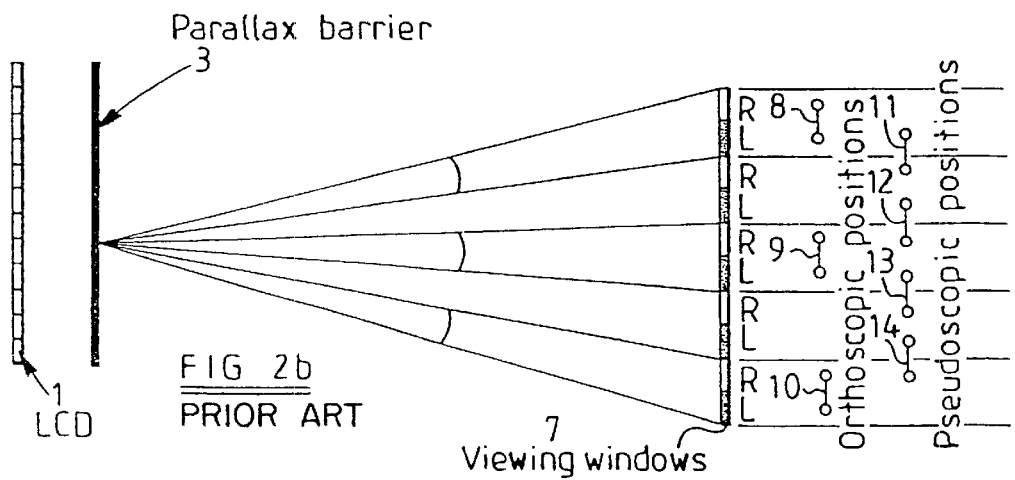
Figure 3:
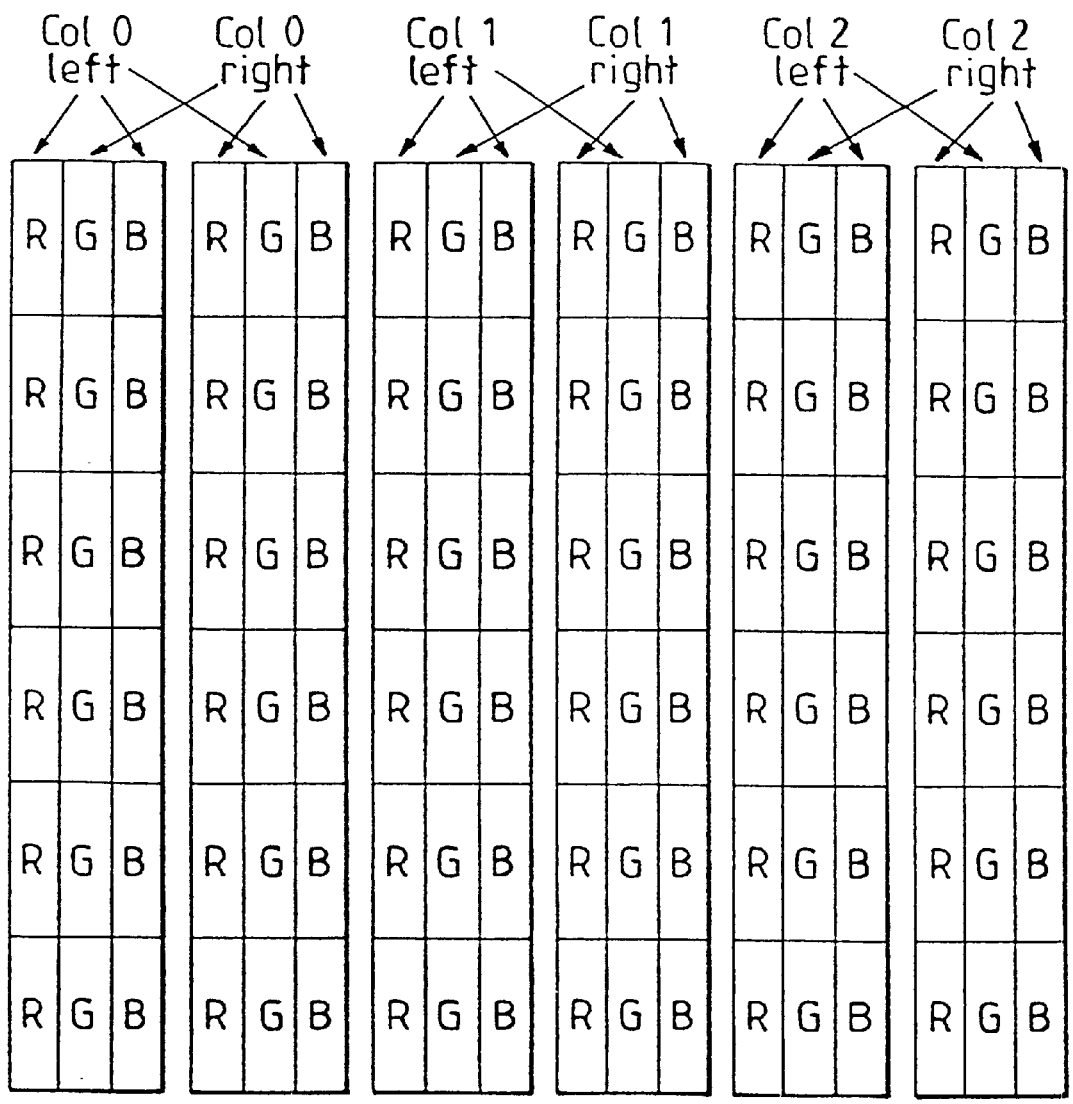
FIG. 3 is a view similar to FIG. 1 illustrating the displaying of stereoscopic images.
Figure 6A:
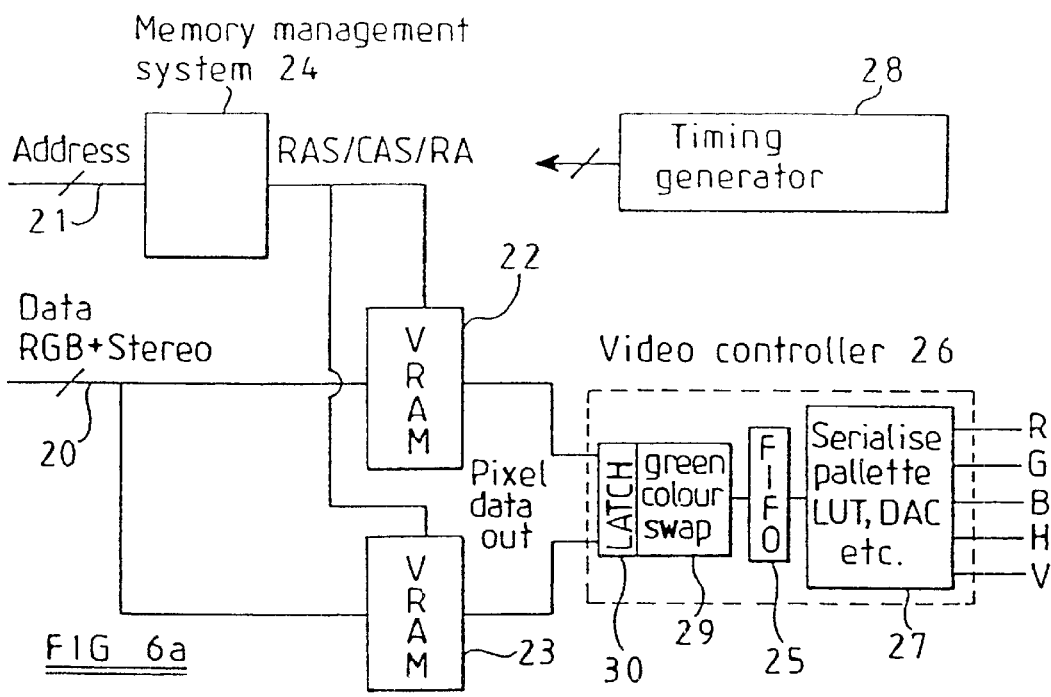
FIG. 6a is a block schematic diagram of a display controller constituting an embodiment of the invention.

The display controller shown in FIG. 6a is for use with any type of scanned display, for instance of the LCD type shown in FIG. 3. The display controller is of a type similar to that illustrated in FIG. 4a and is shown as providing known row address select (RAS), column address select (CAS) signals to the address inputs of the memories 22 and 23. The controller receives data in the form of RGB colour component signals and a "stereo" signal indicating whether the image to be displayed is in 2D or 3D.

Figure 4A:
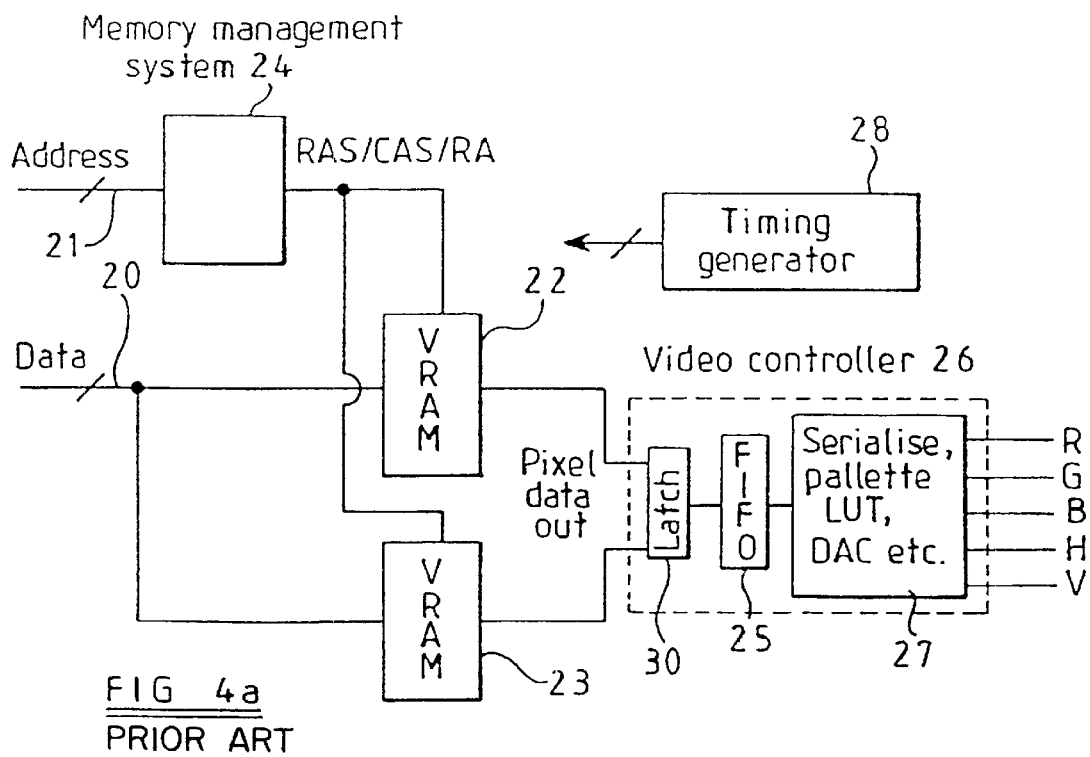
FIG. 4a is a block schematic diagram of a known type of display memory controller.
Figure 6B:
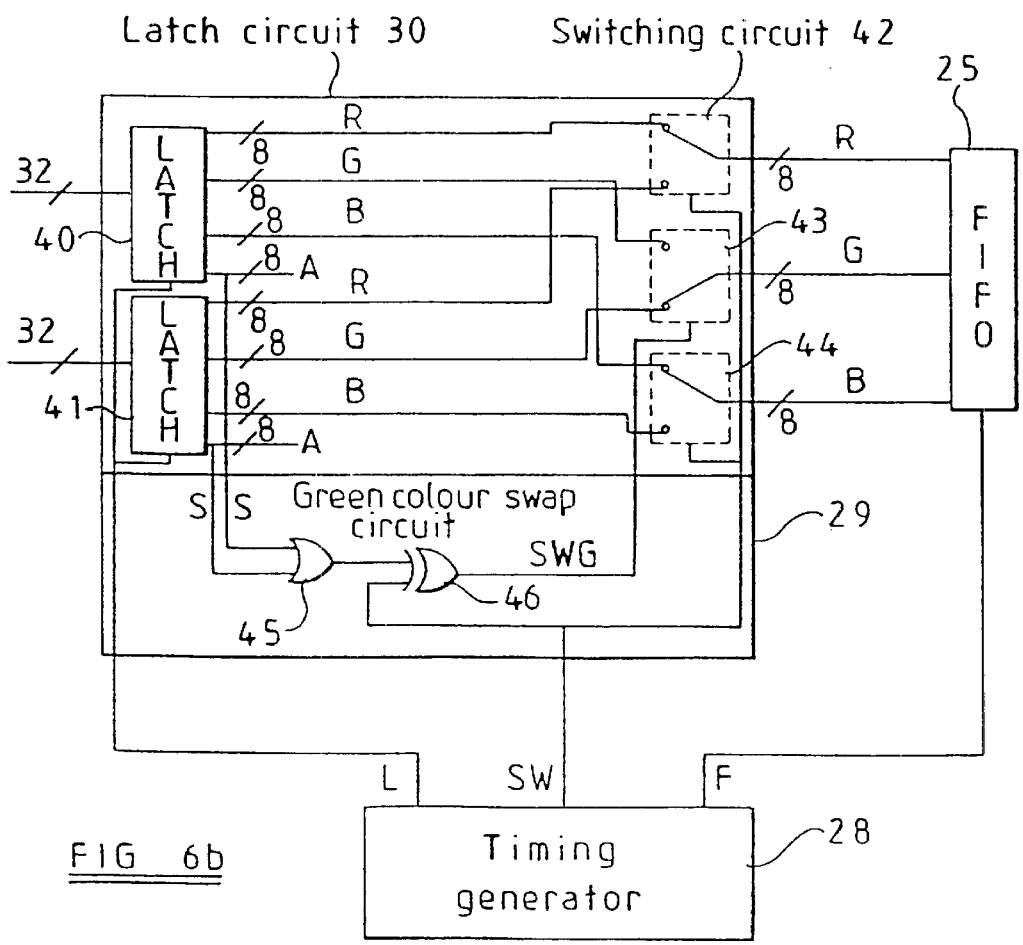

The video controller 26 differs from that shown in FIG. 4a in that the output of the latch circuit 30 includes a green colour swap circuit 29 as shown in more detail in FIG. 6b. The circuit 29 comprises an OR gate 45 having first and second inputs connected to receive the stereo-indicating bits S from the latches 40 and 41. The output of the gate 45 is connected to a first input of an Exclusive-OR gate 46, whose second input is connected to receive switching signals SW from the timing generator 28.

Figure 4B:
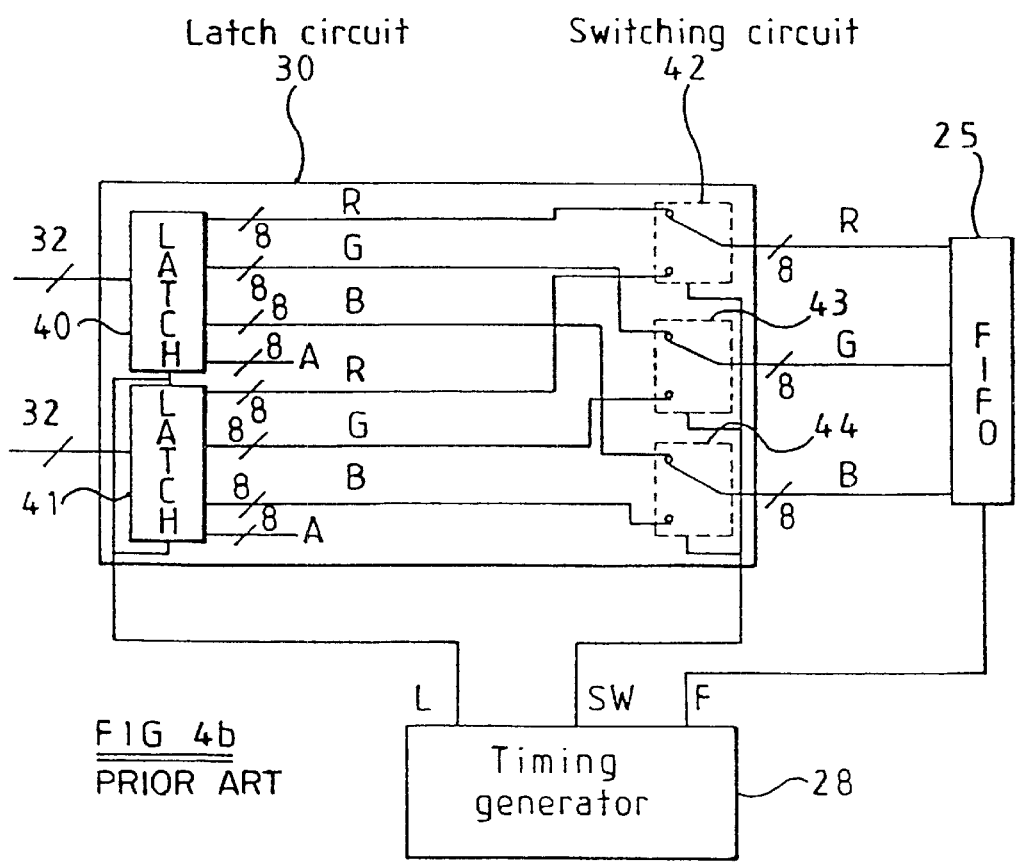

The control inputs of the switching circuits 42 and 44 are connected together and to the output of the timing generator 28 for receiving the switching signals SW in the same way as illustrated in FIG. 4b. However, the switch controlling input of the switching circuit 43 is connected to the output of the gate 46 for receiving green switching signals SWG.

Figure 7:
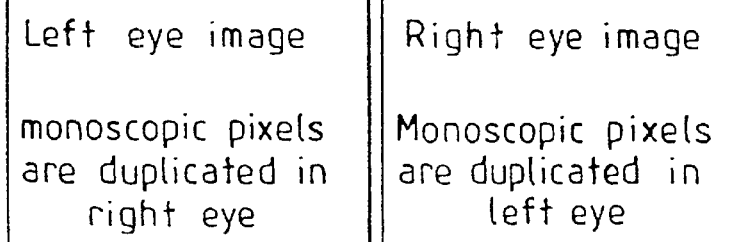

Address signals supplied on the bus 21 to the memory management system 24 are converted into the row address select, column address select and row address signals needed to access the memories 22 and 23. When stereoscopic image data are present, the stereo-indicating bit is set so that the memory 22 stores left eye image data and the memory 23 stores right eye image data as illustrated in FIG. 7. In the case of a 3D autostereoscopic display in which the parallax optic cannot be disabled, it is also possible to write 2D or monoscopic data which must be displayed to both eyes of the observer. In this case, when the stereo-indicating bit is not set, the monoscopic pixel data are duplicated in corresponding memory locations in the memories 22 and 23. In the 3D mode, each of the left and right eye images has half the horizontal spatial resolution of the display device. When operating in the 2D or monoscopic mode, the 2D image likewise has half the lateral resolution of the display device.

Figure 4C:
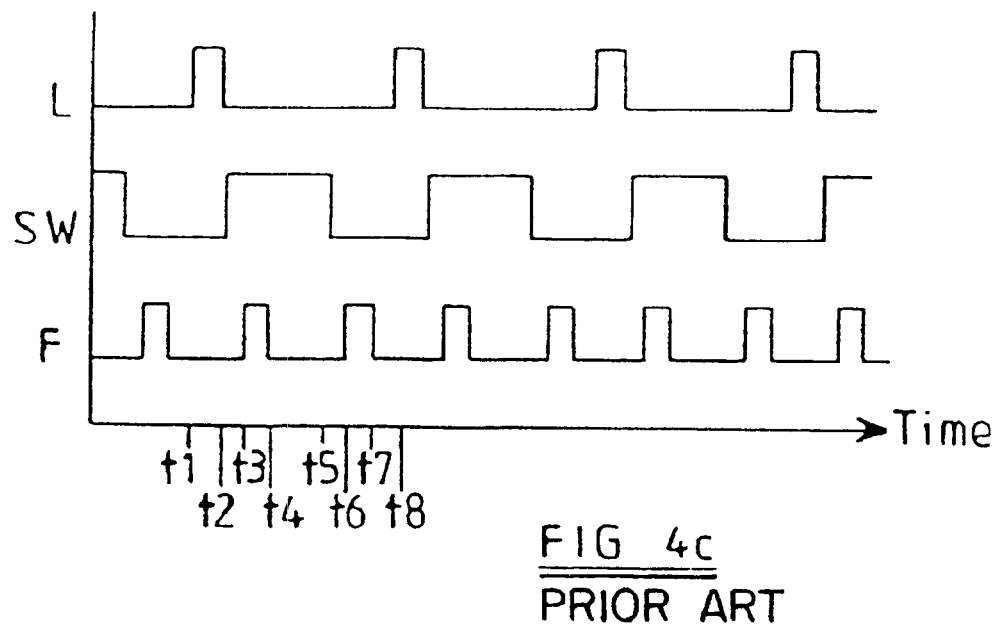
Figure 5:
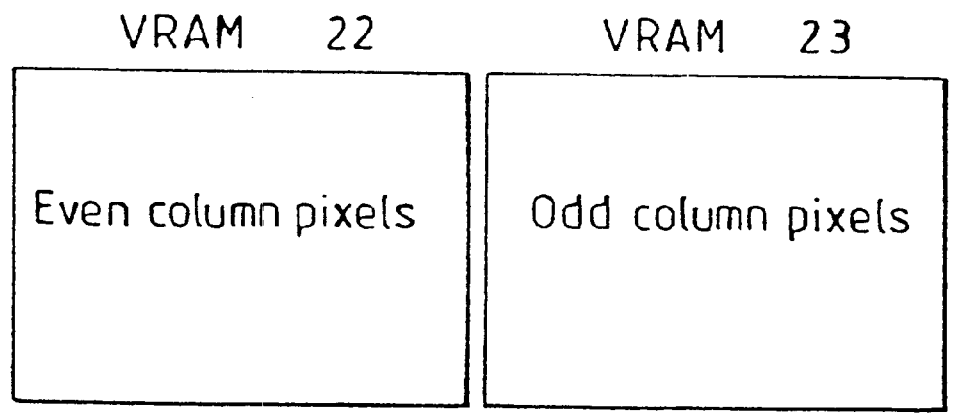

When the stereo-indicating bits are not set ie. are at logic level zero, the output of the gate 45 is at logic level zero so that the gate 46 merely transmits the switching signals SW. The switching circuits 42 are therefore synchronised and operation is as described hereinbefore and as illustrated in FIG. 4c.

Figure 6C:
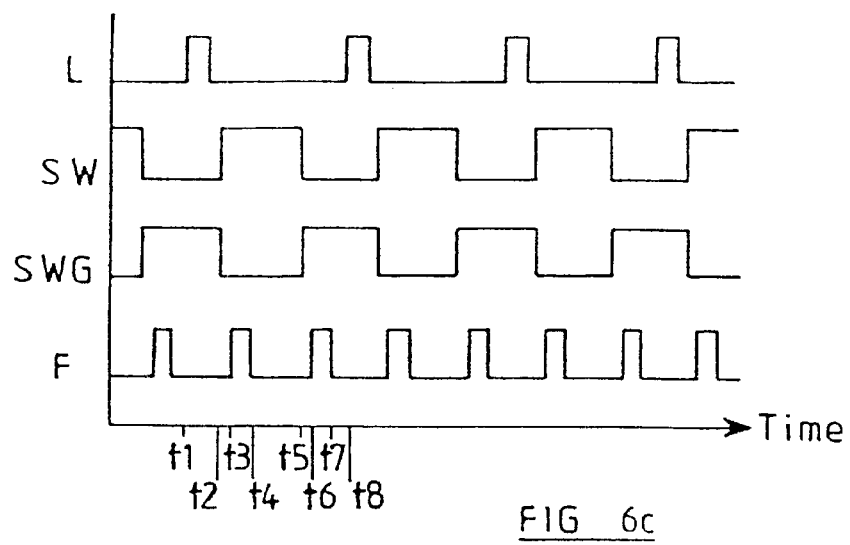

When the stereo-indicating bits S are set to logic level one, the output of the gate 45 is logic level one. The gate 46 therefore functions at a logic inverter so that the switching signal SW is inverted to form the green switching signal SWG as illustrated in FIG. 6c. Thus, whenever the switching circuit 42 and 44 connect the red and blue inputs of the register 25 to the red and blue outputs of the latch 40, the switching circuits 43 connects the green input of the register 25 to the green input of the latch 41, and vice versa. Thus, the left and green colour components are swapped between the pixel columns of adjacent pairs so that the autostereoscopic views are correctly displayed as described hereinbefore with reference to FIG. 3.

In an alternative arrangement (not shown), the parallax optic can be disabled either wholly or selectively in regions where a 2D image is to be displayed. In this case, it is not necessary to duplicate pixel image data in the memories 22 and 23. Instead, the full spatial resolution of the display device or the relevant portion of the device may be used for displaying 2D images.

The memory management system 24 controls reading of the memories 22 and 23 such that left and right eye image pixel data are supplied at the correct times to the latch circuit 30.

Figure 8:
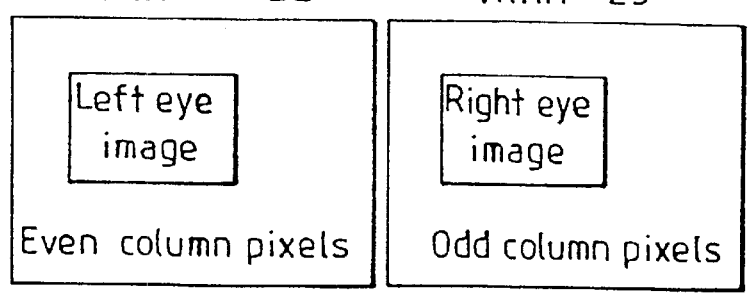

The arrangement of pixel data storage in the memories 22 and 23 shown in FIG. 7 is appropriate for 3D autostereoscopic images which occupy the whole display. However, it is also possible to mix 2D and 3D images as illustrated in the storage arrangement of pixel data shown in FIG. 8. In this case, a half width image must be drawn for each eye but the horizontal image origin for the full screen must also be divided by two for the image to be placed correctly on the half width screen. If the image is drawn as for the full width screen, all horizontal pixel coordinates may simply be divided by two. If the image is drawn at the necessary size, the origin of the stereo region must be known and is divided by two to locate the stereoscopic region correctly. Horizontal coordinates within the image must be unaffected because the image must remain the same size.

To illustrate this, a specific example will be described in the case where the controller is used with a display whose screen size is 800×600 pixels. Such an arrangement may have three modes of operation, namely a 2D or monoscopic mode, a full screen stereoscopic mode and a part screen stereoscopic mode.

In the monoscopic mode, the full screen size is used conventionally so that images may be "drawn" in any area up to the full 800×600 pixel area.

In the full screen stereoscopic mode, the controller is set to make one of the memories 22 and 23 (half the available screen memory) available for image display. The left image occupies one half (half the width of the screen) whereas the right image occupies the other half. When drawing a stereoscopic image, each of the two constituent images is half the width of the full image ie. each of the left and right eye images occupies 400×600 pixels so that, when the images are interlaced, the full 800×600 pixel screen capacity is occupied.

Figure 9:
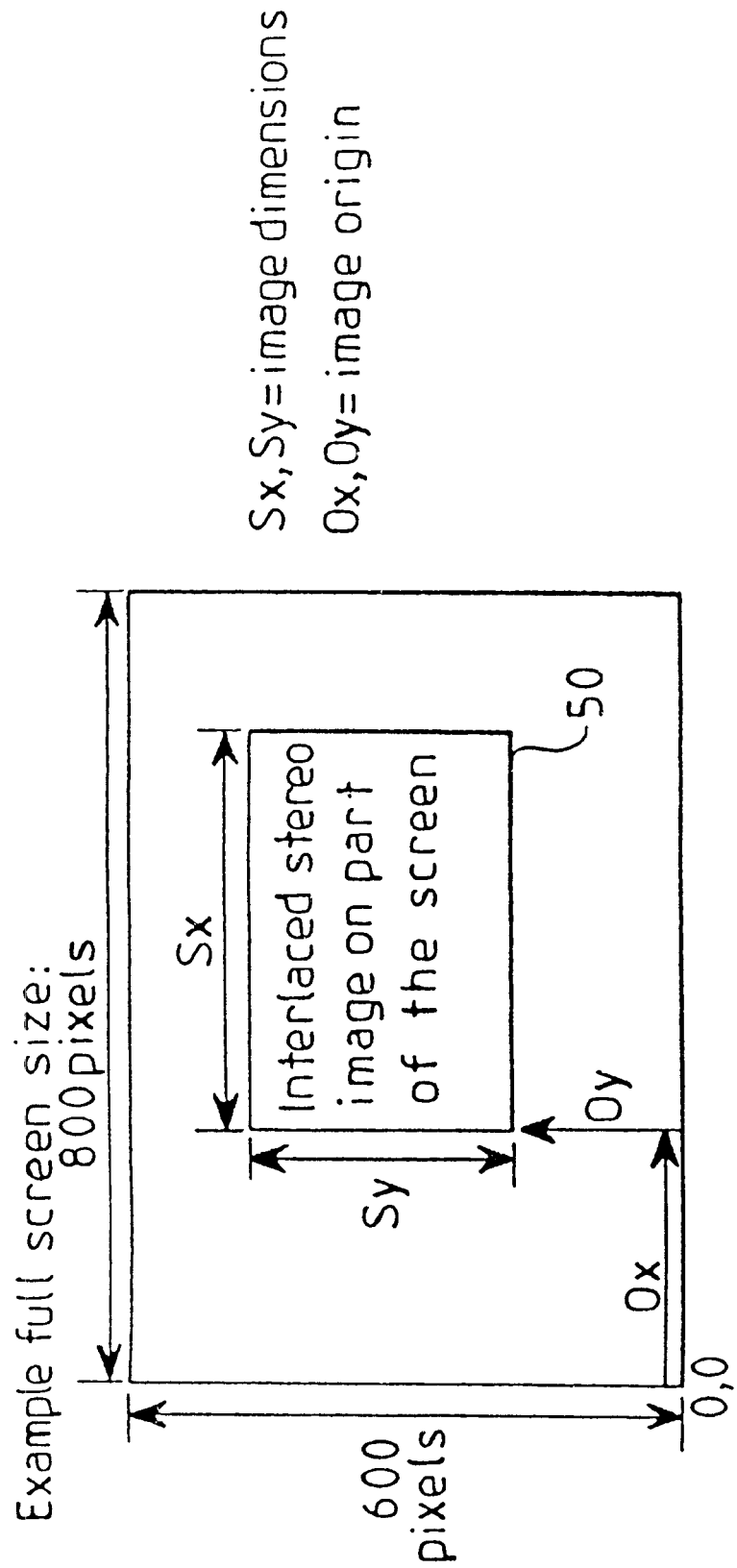
FIG. 9 is a diagram illustrating a typical display screen displaying a 3D image within a 2D image.

In the part screen stereoscopic mode, one or more interlaced stereoscopic images is displayed on the screen and is surrounded by a monoscopic image as illustrated in FIG. 9. The screen is referred to Cartesian coordinates such that the screen origin (0,0) is at the bottom left corner of the screen. FIG. 9 illustrates a single interlaced stereoscopic image on part of the screen at 50. The horizontal and vertical dimensions of the stereoscopic image are given by $S_x$ $S_y$ whereas the image origin (bottom left corner) of the stereoscopic image has coordinates $O_x$ and $O_y$ relative to the screen.

Figure 10:
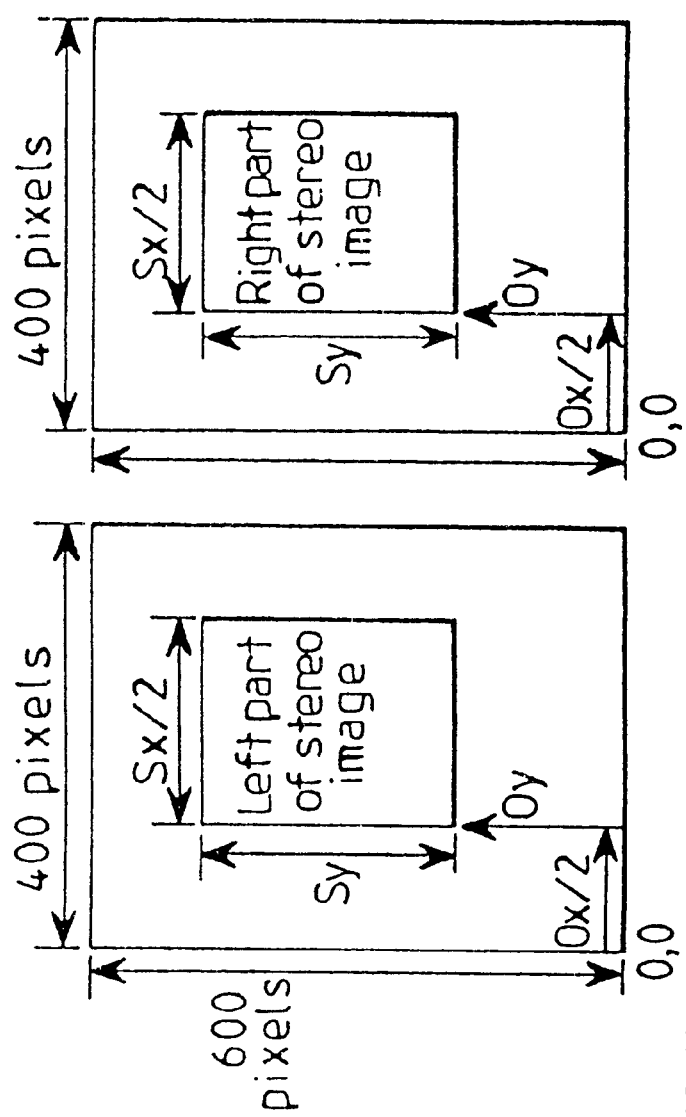
FIG. 10 illustrates how the screen image of FIG. 10 is processed.

The left and right images are drawn at half the final width of the interlaced stereoscopic image. Also, the horizontal coordinate of the image origin must be divided by two to fit into the "smaller screen space" available for each image as illustrated in FIG. 10.

Figure 11:

In the case where the bus 20 comprises a 32 bit parallel bus, each pixel video data may be of the form illustrated in FIG. 11. The red (R), green (G) and blue (B) components each occupy 8 bits to leave 8 spare bits A. The 8 "spare" bits are usually unused but might, for example, hold alpha information or other control data. However, one of these bits is allocated to be the stereo-indicating bit.

Figure 12:
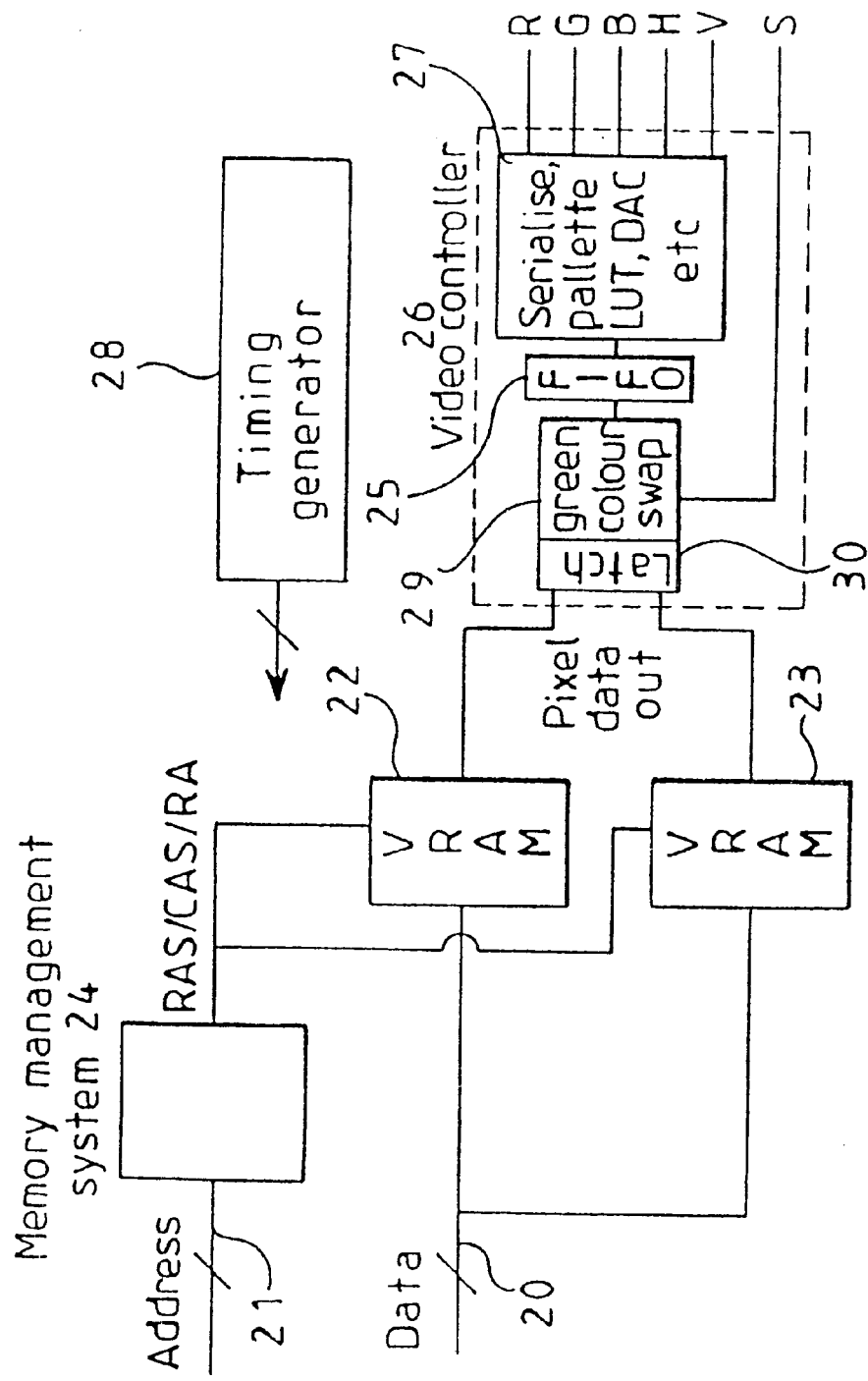
FIG. 12 is a block schematic diagram of a display controller constituting another embodiment of the invention.

FIG. 12 illustrates a display of the type shown in FIG. 6a but modified to supply to the display the stereo-indicating bits from the pixel data on the bus 20. Such an arrangement may be used with a switchable 2D/3D display such that the display may be controlled on a pixel by pixel basis.

Figure 13:
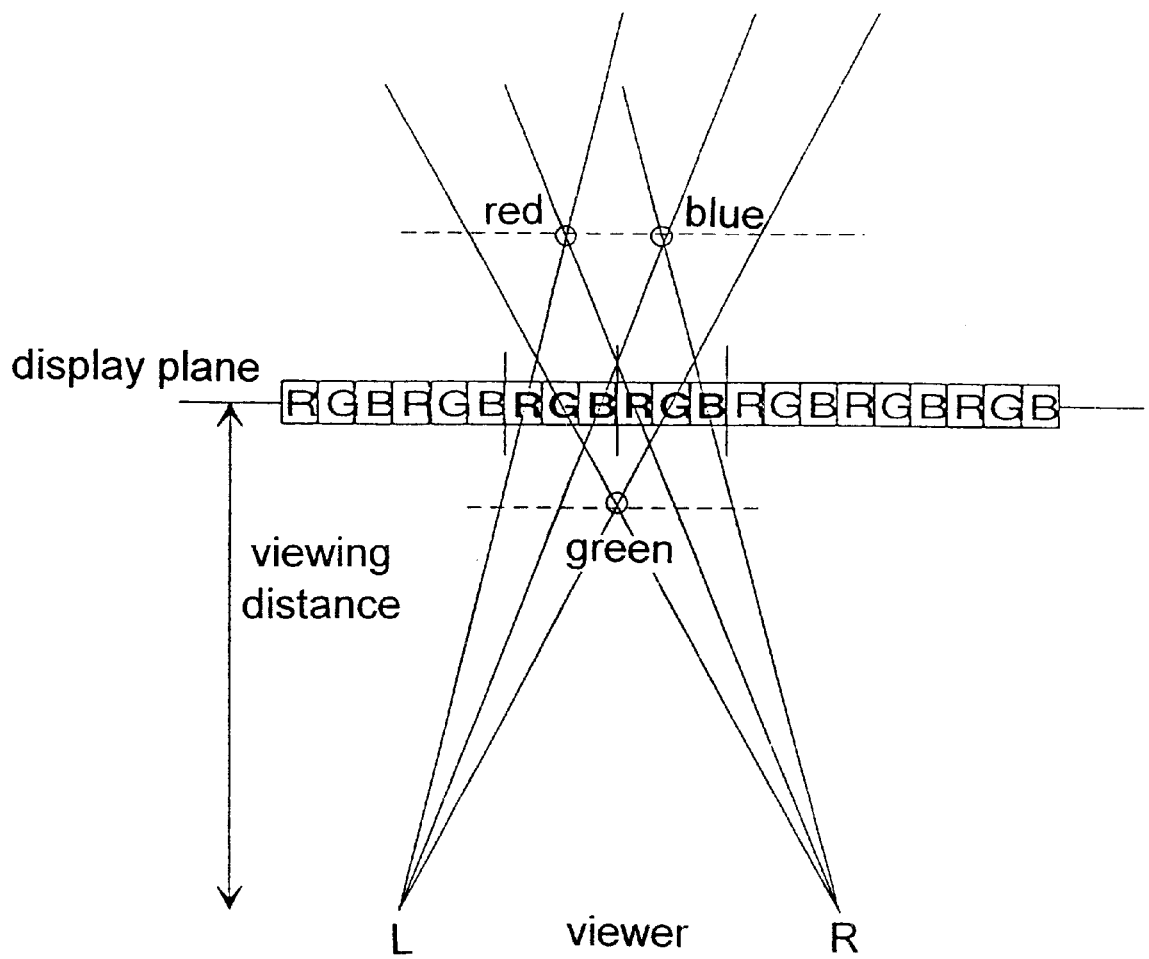
FIG. 13 illustrates schematically the various colour component depth planes produced with the embodiments of FIGS. 6, 12, and 13

The arrangement described above results, in one example, in the viewer perceiving red, green, and blue components of an image at the planes illustrated schematically in FIG. 13. Notably, the red and blue components are observed at a plane lying behind the display plane, whilst the green component is observed at a plane lying in front of the display plane. This disparity between display planes may result in a slight deterioration in the displayed image.

It is possible to solve this problem, whilst at the same time ensuring that the red, green, and blue colour components for the left and right images are displayed at the correct spatial locations relative to the viewer's eyes, by merely delaying the green colour components of both images by one pixel relative to the red and blue colour components. Of course, in other display configurations it may be the red or blue components which are delayed.

Figure 14:
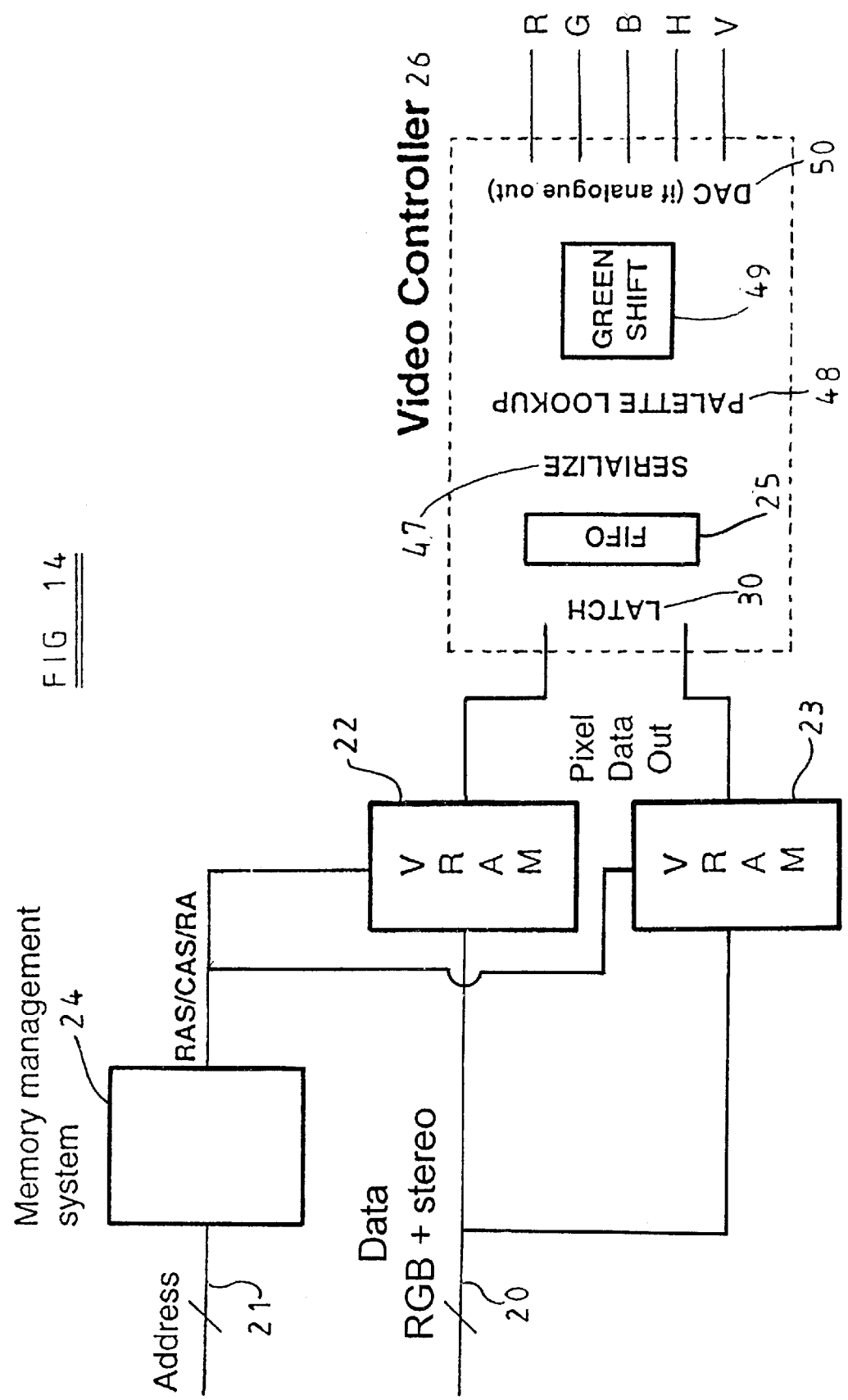
FIG. 14 is a block schematic diagram of a display controller constituting yet another embodiment of the invention.
Figure 15:
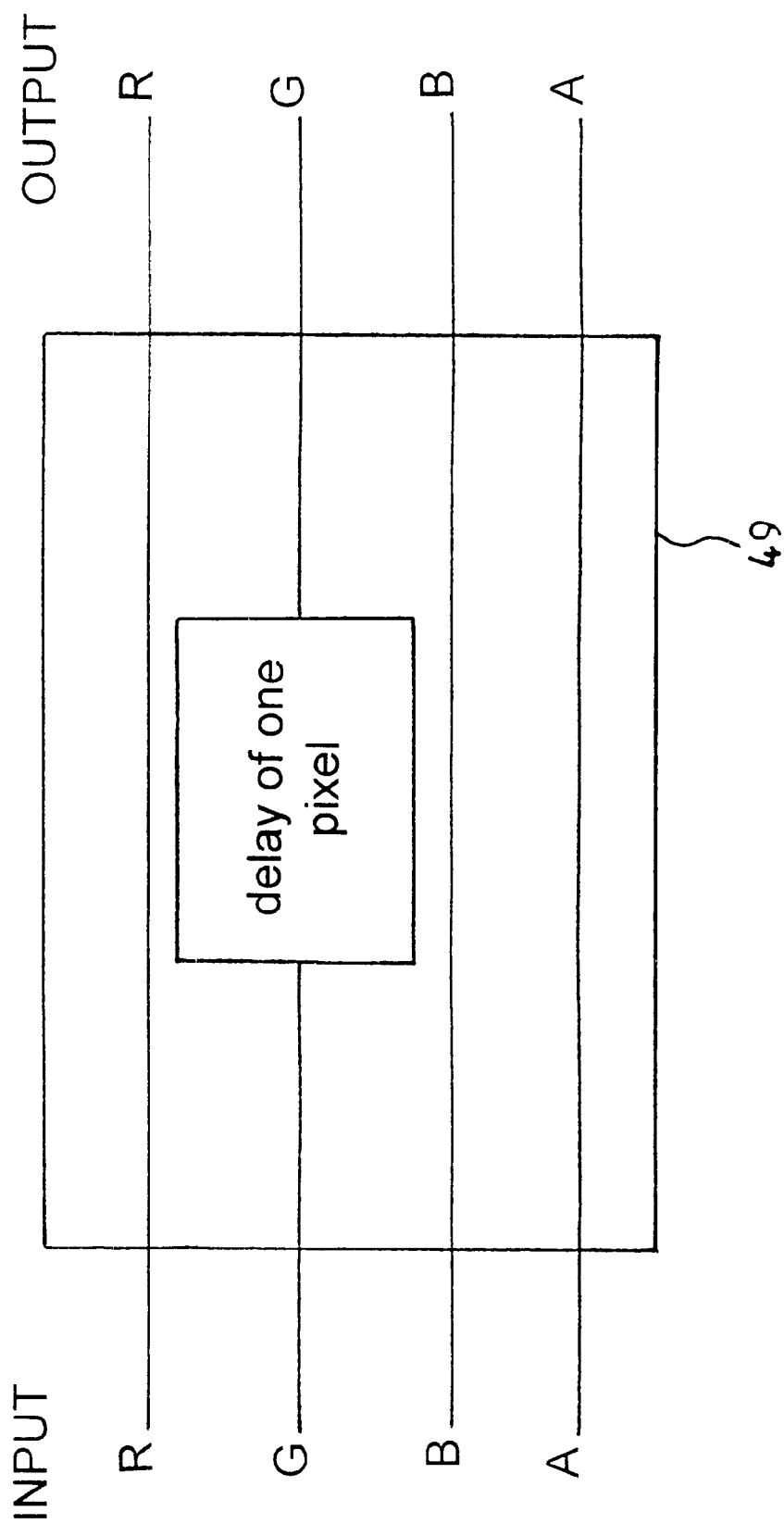
FIG. 15 illustrates a delay buffer of the controller of FIG. 14.

There is illustrated in FIG. 14, in block diagram form, a hardware arrangement for producing a one pixel delay in the green components of the left and right images. Those components common to the display controller of FIG. 6a are identified with like numerals. The video controller of FIG. 14 differs from that of FIG. 6a in that the former does not have the green colour swap circuit 29. Rather, the output of the latch circuit 30 is provided directly to the FIFO register 25. Circuits 47 and 48, which receive the output from the FIFO, correspond to circuit 27 of FIG. 6a except that the digital to analogue converter (DAC) function (optional in the embodiment of FIG. 6a) is not present. The output from circuit 48, in digital form, is provided to a green shift circuit 49 which may be for example a FIFO buffer. The circuit 49 introduces the required one pixel delay into the green component of both the left and right images, relative to the red and blue components. Assuming that the input to the display needs to be digital, the output from the circuit 49 is passed to a digital to analogue converter 50. The green shift circuit 49 is shown in more detail in FIG. 15. The final display may be improved by initialising the display buffer with a suitable colour level, e.g. black, at the start of each new row. This is preferable to using the last green component from the previous row.

It will be appreciated that the controller of FIG. 14 is much simplified over that of FIG. 6a, as the former does not require the more complex latch and swap circuit of the latter. It will also be appreciated that the delay to the green colour components may be introduced at any appropriate point in the controller, i.e. not necessarily immediately before the digital to analogue converter 50. This technique is also not limited to use in video controllers having a memory associated with each separate image.

Figure 16:
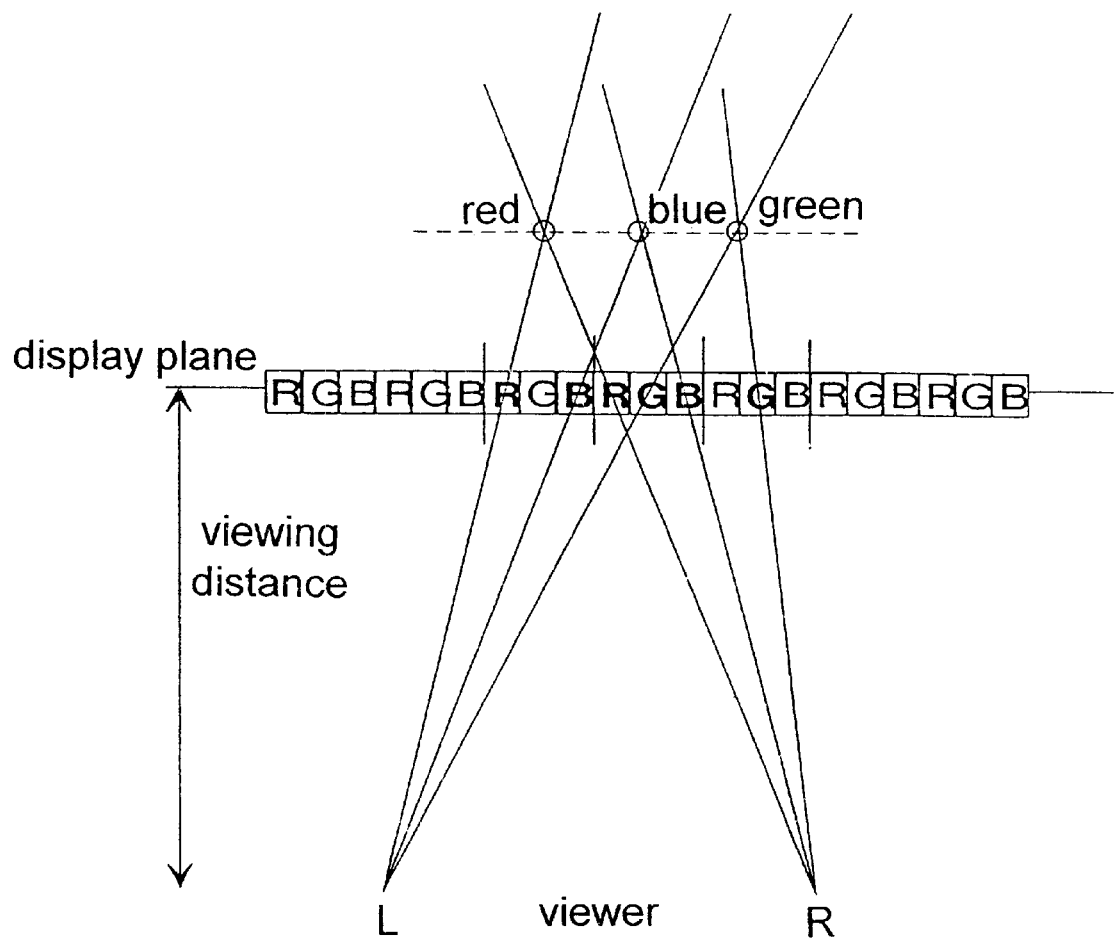
FIG. 16 illustrates schematically the various colour component depth planes produced with the embodiment of FIG. 14.

FIG. 16 illustrates the colour component depth planes which result from the display of FIG. 14 for one specific example. It will be seen that all colour components, red, green, and blue, are displayed in the same plane immediately behind the display plane. This improved result generally holds true for all displayed stereoscopic images.

Figure 17:
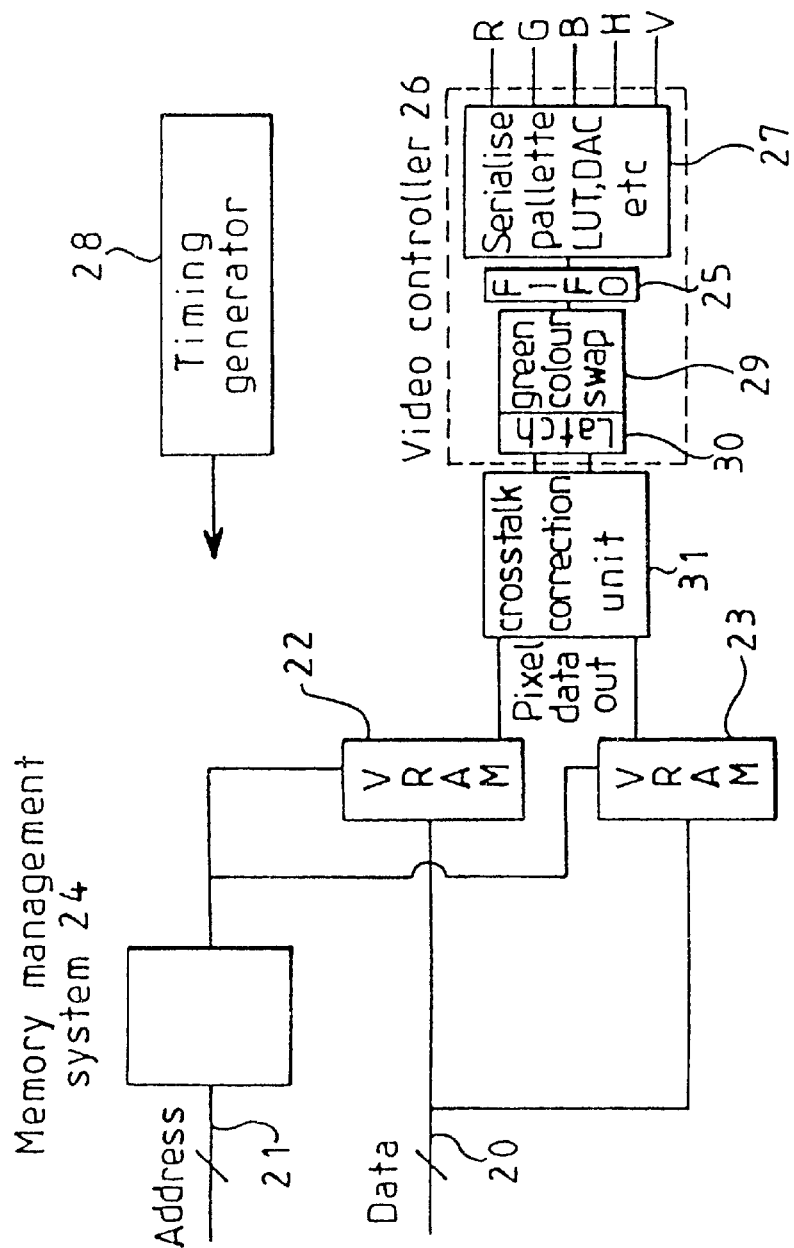
FIG. 17 is a block schematic diagram of a display controller constituting another embodiment of the invention.

There will now be described a further embodiment of the invention with reference to FIG. 17. The display controller illustrated in FIG. 17 differs from that shown in FIG. 6a in that a crosstalk correction unit 31 is provided for reducing crosstalk between the left eye and right eye images of a 3D autostereoscopic display. The crosstalk correction unit 31 is disposed between the memories 22 and 23 and the video controller 26.

Although crosstalk reduction is desirable for all types of displays, effective crosstalk reduction can be readily provided in flat panel displays, where the crosstalk from one view is registered well with the pixels in the other view.

The method of reducing crosstalk is based on adding a base level of grey to every pixel of both the left and right images so as to raise the background grey level. The amount of grey is preferably equal to or greater than the amount of crosstalk correction required. A percentage of the left image corresponding with the amount of crosstalk to be corrected is then subtracted from the right image and vice versa. This results in a low intensity negative image in the background grey level. When the corrected images are displayed, the crosstalk fills in the negative images so that a uniform background grey level is restored. Thus, image contrast is sacrificed so as to improve crosstalk and hence improve the perceived 3D image quality.

The amount of crosstalk correction required may be determined by experimental measurement of a display. The crosstalk correction factor may then be set in various ways, such as by an electronic bus connected to a central processing unit of the system, a data cable connected to a control knob, or by putting the data into available ones of the spare bits A of the 32 bit pixel data.

The method is described in more detail hereinafter for a pixel in the left image and its corresponding pixel in the right image, where:

$I_l$—is—the incoming RGB colour vector for the left pixel;

$I_r$—is—the incoming RGB colour vector for the right pixel;

$I_b$—is—the colour vector with raised background grey level;

$I_o$—is—the output colour vector with crosstalk correction;

C—is—the scalar crosstalk correction in the range [0.255]; and $I_m$=255—is—the scalar maximum value of each RGB component.

All of the individual values are integers in the range [0,255] assuming 8 bits per colour component in each 24 bit full colour pixel.

First, a background grey level is added to the left image pixel:

$$I_b = I_l * \left(\frac{I_m - C}{I_m}\right) + C \quad (1)$$

The corresponding right image pixel crosstalk correction is subtracted from the new value of the left image pixel:

$$I_o = I_b - I_r * \frac{C}{I_m} \quad (2)$$

The value $I_o$ is then output as the new left image pixel colour value.

This method must be applied to every pixel in the left image to correct for right image crosstalk and to every pixel in the right image to correct for left image crosstalk. The method may be implemented in software and provides a good improvement in the image quality on flat panel displays.

For a hardware implementation in conjunction with the image interlacing described hereinbefore, the method may be performed using only integer arithmetic. This significantly reduces the complexity of a hardware implementation by removing the need for a floating-point arithmetic unit.

For binary computing devices the use of numbers that are a power of two has significant advantages. For this reason the input pixel colour values are raised by one from the range [0,255] to the range [1,256]. The above method can then be re-written as below where K is the scalar cross talk correction in the range [1,256].

From equations (1) and (2)

$$(I_o + 1) = (I_l + 1)\left(\frac{(I_m + 1) - K}{(I_m + 1)}\right) + K - (I_r + 1)\left(\frac{K}{(I_m + 1)}\right) \quad (3)$$

multiplying out the above gives:

$$(I_o+1)(I_m+1)=(I_l+1)(I_m+1)+K(I_m+1)-K(I_l+1)-K(I_r+1) \quad (4)$$

rearranging this gives:

$$I_o = I_l + \frac{K(I_m - I_l - I_r - 1)}{(I_m + 1)} \quad (5)$$

This is computed efficiently using a bit shift operation instead of division since the value $(I_m+1)=256$ and is accounted for with a bit-wise right shift by 8 bits.

$$I_o = I_l + K(I_m - I_l - I_r - 1) >> 8 \quad (6)$$

The output crosstalk corrected value for the right pixel is computed similarly:

$$I_o = I_r + K(I_m - I_l - I_r - 1) >> 8 \quad (7)$$

Figure 18:
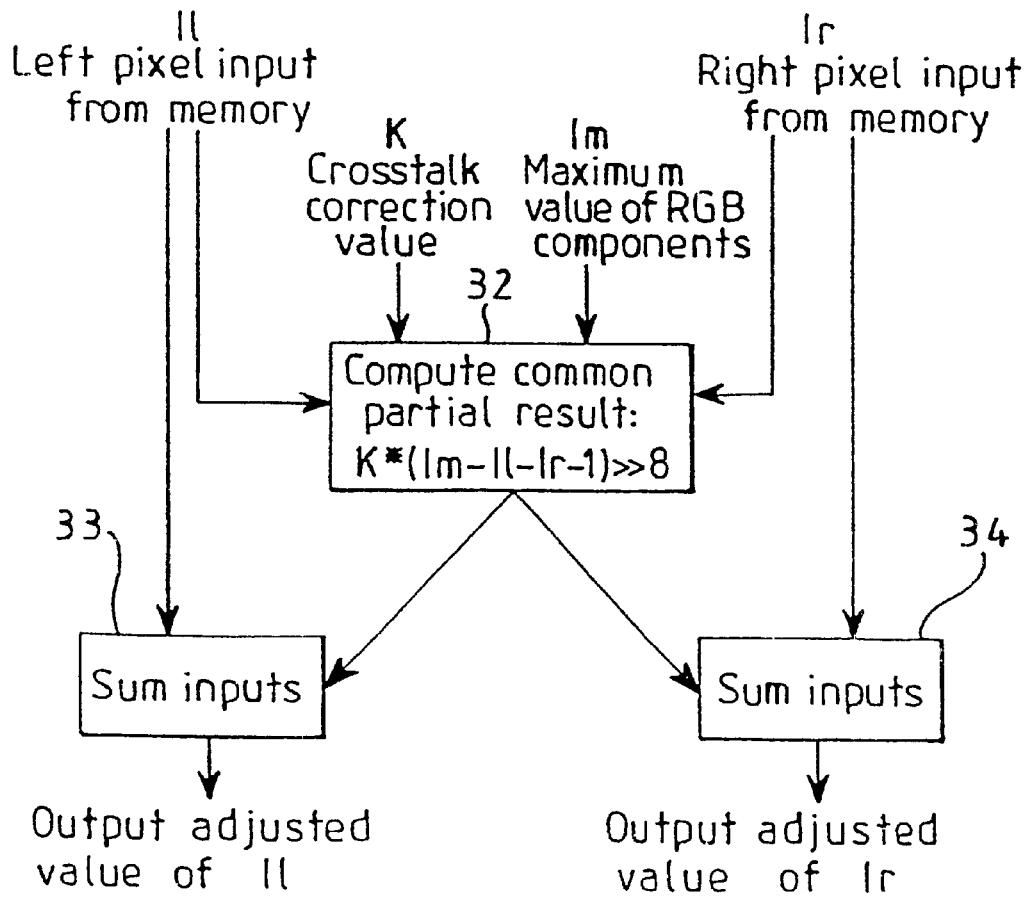
FIG. 18 is a diagram illustrating a method of reducing crosstalk between images constituting an embodiment of the invention.

This computation is illustrated in FIG. 18, where the partial result $K(I_m - I_l - I_r - 1) >> 8$ is computed at 32 and is added to the left and right pixel values $I_l$ and $I_r$ at 33 and 34, respectively.

If the value of K is restricted to be a factor two, where $K = 2^n$, then the computation is more simply implemented since the multiplication by K can be incorporated into the right shift, resulting in a computation requiring only addition, subtraction and right shift operations, ie:

$$I_o = I_r + (I_m - I_l - I_r - 1) >> (8-n) \quad (8)$$

Use of expression (6) or (8) has the advantage that all the arithmetic is integer with the largest resulting number requiring only an 18 bit signed value, thus greatly reducing the implementation complexity of the hardware.

The crosstalk correction methods described hereinbefore assume that the display used has a perceived linear response to the input values, this is not normally the case and it is usually compensated for by using gamma correction in the video display driving circuit, for instance as disclosed in Glassner, "Principles of Digital Image Syntheses", Morgan Kaufman, 1995, Chapter 3, pp 97–100. With the above method, the gamma correction can be applied to every pixel after the crosstalk correction has been computed. Alternatively, it can be applied to the correction factor K alone before crosstalk correction is computed.

Also, the above methods assume a 24 bit or similar full colour pixel value. This is not always the case and, in some systems, colour indexing is used to save memory. This is where there is a limited range of colour values and the actual value stored in video memory is an index into a look-up table, which holds the full 24 bit RGB values. Often, with this approach, only 8 bits are stored per pixel, resulting in 256 possible colours on the display at any one time. For colour indexing systems, the colour swapping and crosstalk correction should be performed after the colour index has been decoded into its 24 bit RGB display driving values.

Figure 19:
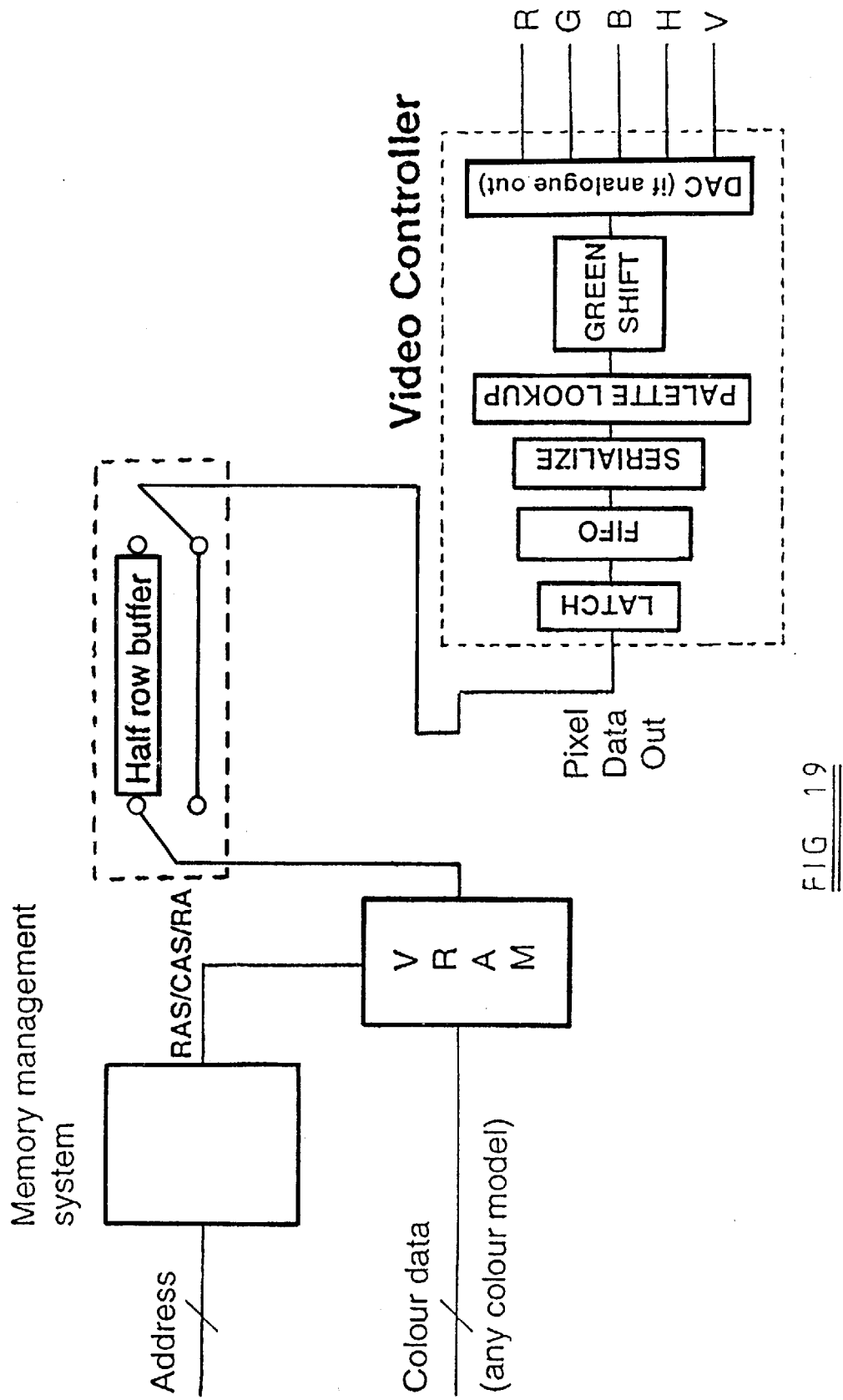
FIG. 19 is a block schematic diagram of a display controller constituting another embodiment of the invention.

FIG. 19 is a diagram illustrating a display controller having a single memory device 51 which comprises a 2-D array of memory elements mapped to respective pixels of the LCD display. The memory management system 24 is arranged to write the 400×600 picture elements of the left image into the first block of 400 columns of the memory device and the 400×600 picture elements of the right image into the second block of 400 columns. It will be appreciated that this allocation of memory is desirable from the point of view of efficiently writing data to the memory.

The memory management system 24 causes picture element data to be read from the memory device 51 row by row. The first half of each row, i.e. picture elements of the left image, is read into a half row buffer. The second half of the row, i.e. picture elements of the right image, is then read from the memory and the picture elements thereof interleaved with the buffered picture elements to produce the required right left alternation. The interleaved data stream is then provided to a video controller corresponding to that of the embodiment of FIG. 14 (alternatively the controller of FIG. 6a may be used).

Figure 20:
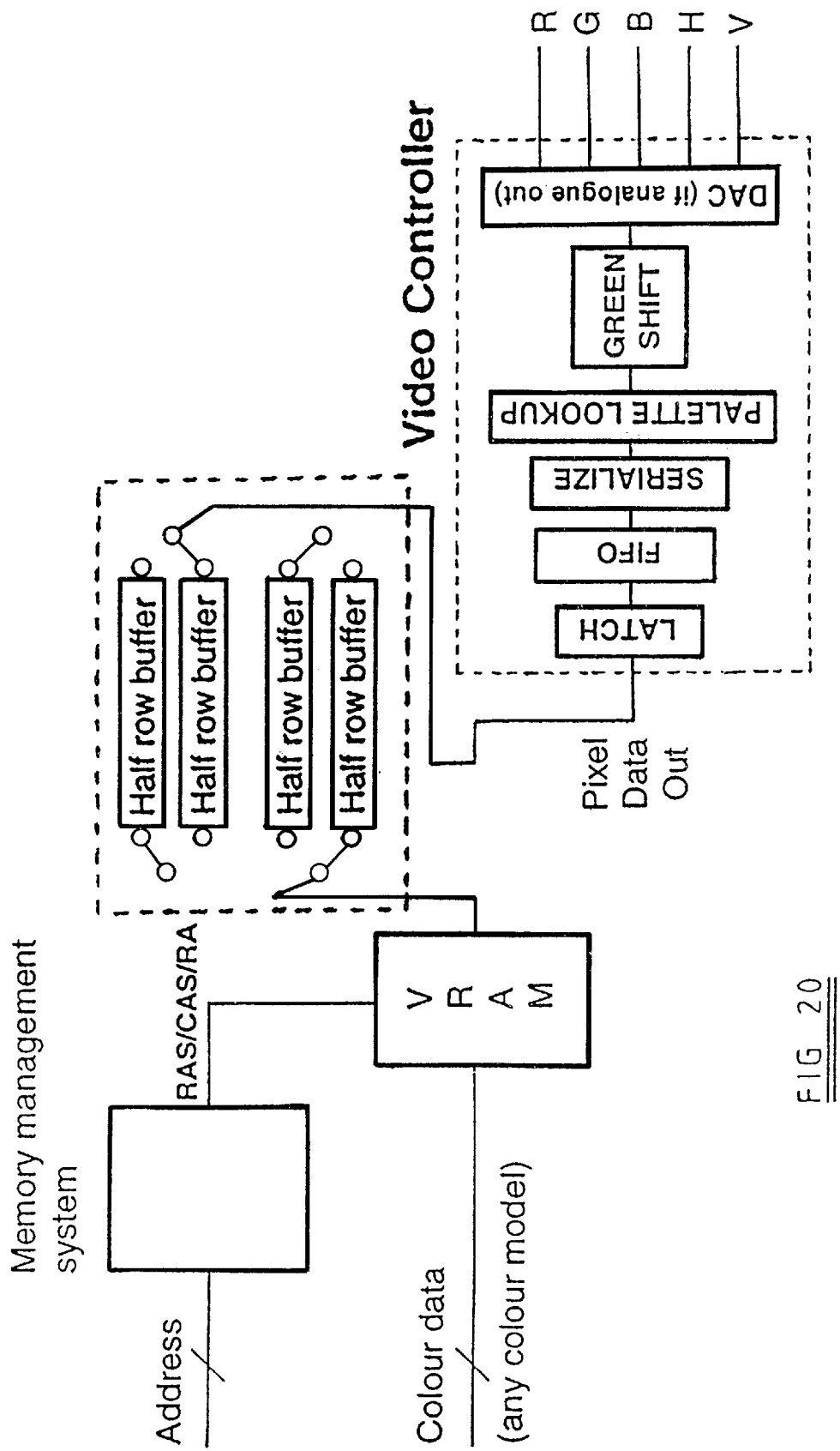
FIG. 20 is a block schematic diagram of a display controller constituting another embodiment of the invention.

FIG. 20 illustrates an alternative buffer arrangement to that described in FIG. 19. The buffer arrangement comprises two pairs of half row buffers 52, 53 which alternately receive picture element rows read from the memory device 51. Thus a first row is read into a first of the buffer pairs 52 with the next row subsequently being read into the second of the buffer pairs 53. Within the first buffer pair 52, the picture elements of the left image are read into a first of the half row buffers 52a with the picture elements of the right image being read into the second of the half row buffers 52b. Whilst the picture elements contained in the half row buffers 52a, 52b are being interleaved and output to the video controller 26, the next row of picture elements is being read into the second pair of half row buffers 53a, 53b. Subsequently, as the picture elements contained in the half row buffers 53a, 53b are being interleaved and output, the next row of picture elements is being read into the half row buffers 52a, 52b.

What is claimed is:

1. A method for reducing crosstalk between first and second images defined by respective sets of picture elements, to produce respective sets of crosstalk corrected picture elements, the method comprising the steps of:

adding a grey level to the first image to form a first sum;

adding a grey level to the second image to form a second sum;

subtracting from the first sum an amount equal to a given fraction of the second image; and subtracting from the second sum an amount equal to a given fraction of the first image, wherein the method further comprises a calculation step of a partial result which is used to determine the crosstalk corrected picture elements for both the first and second images.

2. A method according to claim 1, wherein each of the picture elements comprising M color components having an intensity value, the method further comprising the steps of:

for an intensity level Ix of each of the picture elements of the first image, determining a crosstalk corrected picture intensity level Iox according to either:

$$Iox = Ix + [K(Im - Ix - Iy - 1)/(Im + 1)]$$

or an equivalent form of the above relationship: and for an intensity level Iy of each of the picture elements of the second image, determining a crosstalk corrected picture intensity level Ioy according to either:

$$Ioy = Iy + [K(Im - Ix - Iy - 1)/(Im + 1)]$$

or an equivalent-form of the above relationship, where K is a scalar crosstalk correction; and
Im is a scalar maximum value among the color components.

3. A method according to claim 2, wherein the partial results is expressed as K(Im−Ix−Iy−1).

4. A method according to claim 3, wherein division operations for determining the crosstalk corrected picture intensity levels Iox and Ioy are carried out by using a bit shift operation on the partial result.

* * * * *